United States Patent [19]

Ernst et al.

[11] Patent Number: 4,509,707
[45] Date of Patent: Apr. 9, 1985

[54] SELF-LOCKING BELT REELING DEVICE FOR MOTOR VEHICLE SAFETY BELTS

[75] Inventors: Hans-Hellmut Ernst, Sülfeld; Holger Seel, Aidlingen, both of Fed. Rep. of Germany

[73] Assignee: AUTOFLUG GmbH, Rellingen, Fed. Rep. of Germany

[21] Appl. No.: 540,818

[22] Filed: Oct. 11, 1983

Related U.S. Application Data

[63] Continuation-in-part of Ser. No. 260,034, May 4, 1981, abandoned.

[30] Foreign Application Priority Data

May 3, 1980 [DE] Fed. Rep. of Germany ....... 3017097

[51] Int. Cl.³ .................... A62B 35/02; B65H 75/48
[52] U.S. Cl. .................... 242/107.4 A; 242/107.4 B; 242/107.4 C
[58] Field of Search .............. 242/107.4 R, 107.4 E; 280/806; 297/478, 480

[56] References Cited

U.S. PATENT DOCUMENTS

| | | | |
|---|---|---|---|
| 3,851,837 | 12/1974 | Griffin | 242/107.4 A |
| 3,876,164 | 4/1975 | Dully | 242/107.4 C |
| 4,083,512 | 4/1978 | Rumpf | 242/107.4 A |
| 4,223,853 | 9/1980 | Ernst | 242/107.4 R |
| 4,350,313 | 9/1982 | Adomeit | 242/107.4 C |

FOREIGN PATENT DOCUMENTS

| | | |
|---|---|---|
| 1033701 | 12/1976 | Canada . |
| 1517716 | 7/1978 | United Kingdom . |
| 2057853 | 4/1981 | United Kingdom . |

*Primary Examiner*—John M. Jillions
*Attorney, Agent, or Firm*—Becker & Becker, Inc.

[57] ABSTRACT

A self-locking belt reeling device for, in particular, motor vehicle safety belts is provided and includes a housing and a belt rewinding shaft, the latter being mounted in the former in a manner preventing axial movement but allowing radial movement under the action of locking-forces, with the ends of the shaft extending through apertures in the housing and being respectively provided with a disc, preferably a toothed disc, in the plane of each of the apertures, at least one of these discs, when locking-forces occur, engaging in a fixed internal toothing of one aperture. The second aperture has a recess for a latch which is mounted therein, this latch being capable of being pivoted into the cross-section of the aperture and into the toothing of the toothed disc associated with this aperture. An actuating element is located on the latch, this element being controlled by the self-locking device.

20 Claims, 13 Drawing Figures

SELF-LOCKING BELT REELING DEVICE FOR MOTOR VEHICLE SAFETY BELTS

This is a continuation in part of co-pending application Ser. No. 260,034-Seel et al. filed May 4, 1981 now abandoned.

The present invention relates to a self-locking belt reeling device for, in particular, motor vehicle safety belts, and includes a housing and a belt rewinding shaft, the latter being mounted in the former in a manner preventing axial movement but allowing radial movement under the action of locking-forces, with the ends of the shaft extending through apertures in the housing and being respectively provided with a disc, preferably a toothed disc, in the plane of each of the said apertures, at least one of the discs, when locking-forces occur, engaging in a fixed internal toothing of one aperture. The self-locking device can be designed to lock in a belt-sensitive mode and/or in a vehicle-sensitive mode.

With a known belt reeling device of this generic type (German Offenlegungsschrift No. 2,646,238-Adomeit dated April 20, 1978 which is the basic priority disclosure for U.S. Pat. No. 4,350,313-Adomeit issued September 21, 1982 on a Belt Wind-up Roller For Vehicle Safety Belts With Blocking Device), corresponding internal toothings in the housing apertures are associated with the two toothed discs at the ends of the belt rewinding shaft. This design is associated with the effect whereby the shaft, which is displaced radially in the housing when locking-forces occur, can be supported by the housing, on both sides, and that, in accordance therewith, the housing is stressed symmetrically. The walls of the housing which is generally U-shaped, can be designed to be lighter in weight, and a smaller overall width of the complete belt reeling device also results, because the housing walls are funtionally utilized. There is no need for a so-called pressing ring for taking up the load.

With the known design, however, it is advantageous that the shaft is resiliently supported in the radial direction, by its journals, in associated bearings. This resilient form of bearing is a part of the belt-sensitive locking-device, which reacts in the the event of accelerated pulling-out of the belt. The shaft, with the components rigidly connected thereto, as well as the portion of the belt which is wound on the shaft, also belongs to this device, as an inertial mass. In the event of accelerated pulling out of the belt, this inertial mass is acted on, against the action of the springs, and the shaft is thereby displaced radially. Since, however, the belt force acts eccentrically on the roll of belt and on the shaft, at the point at which the belt runs off tangentially from the roll, the shaft and the belt roll are also rotationally accelerated at the same time.

The ratio of the radial acceleration to the rotational acceleration is dependent on the size of the belt roll, and consequently varies according to how much belt has been pulled from the roll. As a consequence of this effect, the ratio of the radial forces necessary for the locking action, to the effective spring forces at the shaft bearings, is also variable. As a result of this, it is impossible to achieve a precisely defined locking action with this heretofore known belt-sensitive locking device.

With this state of the art, the vehicle-sensitive locking mechanism also entails problems; it functions with the aid of a sensor-controlled catch, which engages into one of the toothed discs of the shaft, and lifts the shaft against the action of its bearing-springs. The catch must afterwards be lifted from the toothing of the toothed disc.

It is an object of the invention to provide a self-locking belt reeling device of the initially described type, with the locking action of this device being defined, and being capable of being triggered, independently of the radial forces acting on the shaft, it being nevertheless possible for the locking of the shaft to be initiated at both sides. In doing so, it should also be possible to produce an auxiliary locking mechanism for high loads.

This object, and other objects and advantages of the present invention, will appear more clearly from the following specification in connection with the accompanying drawings, in which.

The belt reeling device of the present invention is characterized primarily in that the second aperture has a recess for a latch mounted therein, this latch being pivotable into the cross section of the aperture and into the toothing of the toothed disc associated therewith, and in that an actuating element is located on the latch, this element being controlled by the self-locking device.

According to further features of the present invention, the second aperture for the belt rewinding shaft in the housing may be tooth-free. Alternatively, the second aperture for the belt rewinding shaft may, over a portion of its periphery, be provided with an inner toothing effective as an auxiliary locking mechanism.

The latch may be pivotable about an axis which is parallel to the axis of the belt rewinding shaft. The actuating element may be embodied as a pin parallel to this pivot axis. The pin may be directed to the outside of the housing.

The recess may have a support surface for an associated support surface of the latch when the latter is pivoted out.

The recess, with the latch as well as inner toothing which, if appropriate, is only present on a portion of the first apperture, may be located in an angular range of 90° to 150°, calculated from the tangential belt run-off point in the rotational direction of the shaft during withdrawal of the belt. In the unloaded state, the engagement between the inner toothing of the first apperture and the associated disc may be displaced, by a lag angle, relative to the engagement between the pivoted-out latch and the associated toothed disc. The angular displacement amounts to at most five degrees.

The latch, by means of a hole, may be mounted on a pin which is located on a retaining member which is fastened to the inner side of the associated housing part in the region of the recess. The retaining member may be embodied as a ring-shaped or annular collar, the central aperture of this collar being arranged coaxial to the second aperture and having the belt rewinding shaft passing therethrough.

That end of the belt rewinding shaft which passes through the second aperture may be mounted on a bearing disc which is fastened to the outer side of the associated housing part and is simultaneously equipped to hold the retaining member. The center of the bearing disc may externally support a collar or sleeve-like extension for journalling or mounting the belt rewinding shaft. The bearing disc, in the zone of movement of the actuating element for the latch, may be provided with a corresponding hole, and the actuating element may have such a length that it can be effectively controlled from the outside of the bearing disc with respect to the latch. The bearing disc and the retaining member may be connected to each other, and may be attached to the housing, by a plurality of common connecting or fastening elements, particularly rivets or pins, which extend or pass through the associated housing part.

The belt rewinding shaft may be mounted outside the housing on lateral housing covers.

At least a portion of the recess for the latch is thinner or narrower in the axial direction of the belt rewinding shaft than the wall thickness of the associated leg of the housing, and the bearing pin on which the bearing hole of the latch is seated may be fastened to this narrower wall thickness of the housing leg. The latch may have a stepped configuration in the axial direction of the belt rewinding shaft in conformity with the configuration of the recess.

A vehicle-sensitive control device, which acts on the actuating element for the latch, may be arranged on the housing.

With the belt reeling device according to the present invention the locking of the belt rewinding shaft is initiated by means of a belt-sensitive and/or vehicle-sensitive self-locking device, which is known per se on the basis of Canadian Pat. No. 10 33 701-Pfabe issued June 27, 1978 as well as British Pat. No. 15 17 716 (Autoflug) published July 12, 1978 (both assigned to the assignee of the present invention) and controls the latch in such a way that it swings into the open cross-section of the second aperture in the housing, and thereby engages into the toothing of the toothed disc which is rotating therein, whereby the shaft is firmly prevented from turning further. If the belt forces do not exceed a customarily normal amount, such as occurs, for example, when the vehicle is braked in an everyday traffic situation, the locking action of the latch on the toothed disc, and thereby on the shaft, is sufficient to restrain the safety belt and the person who is strapped in.

If, however, very much higher belt forces exceeding the normal amount occur during an accident or similar situation, then, after the latch has engaged the toothed disc, such high tensile forces, and such high radial forces resulting from the tensile forces and acting on the shaft and on the belt roll, become effective that these forces radially displace the shaft, as a whole, and in so doing deflect the discs, which are preferably toothed discs and are located at both ends of the shaft and rotate in the apertures of the housing, against the inside of the aperture associated with each disc. If the discs and apertures have no teeth, locking occures, when the shaft is deflected, merely by means of friction (seizing); if the aperture on the latch side is without teeth, but is toothed on the other side, locking then takes place by positive means on both sides, the latch admittedly having to take up the complete load by itself on the latch side. The conditions adjust themselves in the most advantageous manner if the apertures at both sides are internally toothed, i.e., the auxiliary locking thereby achieved satisfies the most exacting requirements in the event of a crash. In the event of peak forces occurring on the belt and on the shaft, the load on the latch is relieved by means of the auxiliary or additional locking mechanism in the form of the internal toothings to which reference has been made.

The latch consequently fulfills a double function, because, on the one hand, it is itself a locking-element in the event of normal loading and, on the other hand, triggers the auxiliary or additional locking-mechanism in the event of an accident, by causing the shaft to be deflected and thereby to be locked by means of the engagement of the toothed discs into the internal toothings of the aperture. No special bearing device or guide device for the latch is required, provided only that care is taken to ensure that the latch, when pivoted-out, can support itself, on the one side, on the associated tooth disc and, on the other side, against its recess, whereupon it reliably triggers the static auxiliary or additional locking mechanism.

In order to achieve reliable engagement of the two toothed discs with the latch on the one side, and with the internal toothing on the other side, it can be expedient if, in the unloaded state, the engagement between the internal toothing and the associated toothed disc is displaced, by a lag-angle, relative to the engagement between the latch and the associated toothed disc when the latch is pivoted outwards, so that the teeth of the toothed disc which interacts with the internal toothing force themselves under load and with a small angular displacement into the corresponding tooth-gaps of the internal toothing.

The invention is also preferentially suitable for belt reeling devices of the type in which the belt rewinding shaft is designated as a part of a pyrotechnic belt-tightener.

Referring now to the drawings in detail, the belt roll-up or reeling device has a U-shaped housing 1, with a U-crosspiece 2 and two U-legs 3, 4 which adjoin the crosspiece at the sides. Housing covers 5, 6 are externally attached to the U-legs 3, 4 in a conventional manner. In each case, the U-legs 3, 4 have comparatively large apertures 7 and 8 for a belt roll-up or rewinding shaft 9, which has an essentially rectangular cross-section and onto which a molded shaft body 10 is pushed.

In the region of each of its ends, the shaft 9 carries toothed disc 11 and 12, which are arranged on the shaft 9 in such a manner that, when the belt reeling device is in the assembled state, these discs run in the apertures 7, 8, in alignment with the legs 3, 4 of the housing.

Figure 1:
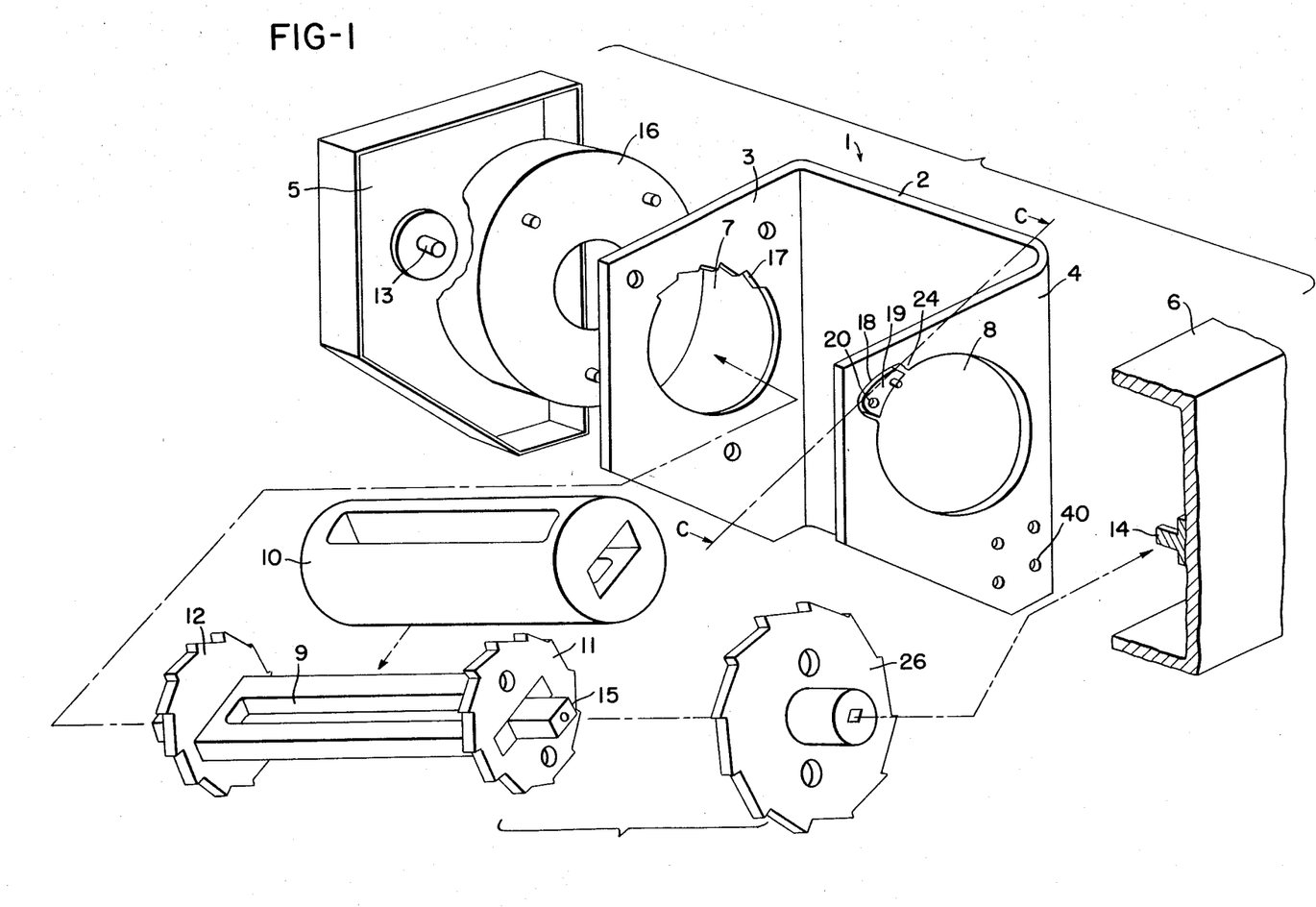
FIG. 1 is an exploded partial view of one embodiment of a belt roll-up or reeling device for motor vehicle safety belts, and in particular shows a first bearing or journalling variation of the belt wind-up or rewinding shaft.

In the embodiment according to FIG. 1, the housing covers 5, 6 are provided with projecting shaft journals 13, 14 on their inner sides, these journals engaging into associated openings 15 in the end faces of the shaft 9. The detailed design of the shaft bearing system can be as described in U.S. Pat. No. 4,223,853-Ernst dated September 23, 1980.

A spring cartridge 16 for the belt retraction or rewinding spring, which is not illustrated, is shown in the upper part of FIG. 1. The spring cartridge 16 is covered by the housing cover 5 when the belt reeling device is in the assembled state.

Figure 2:
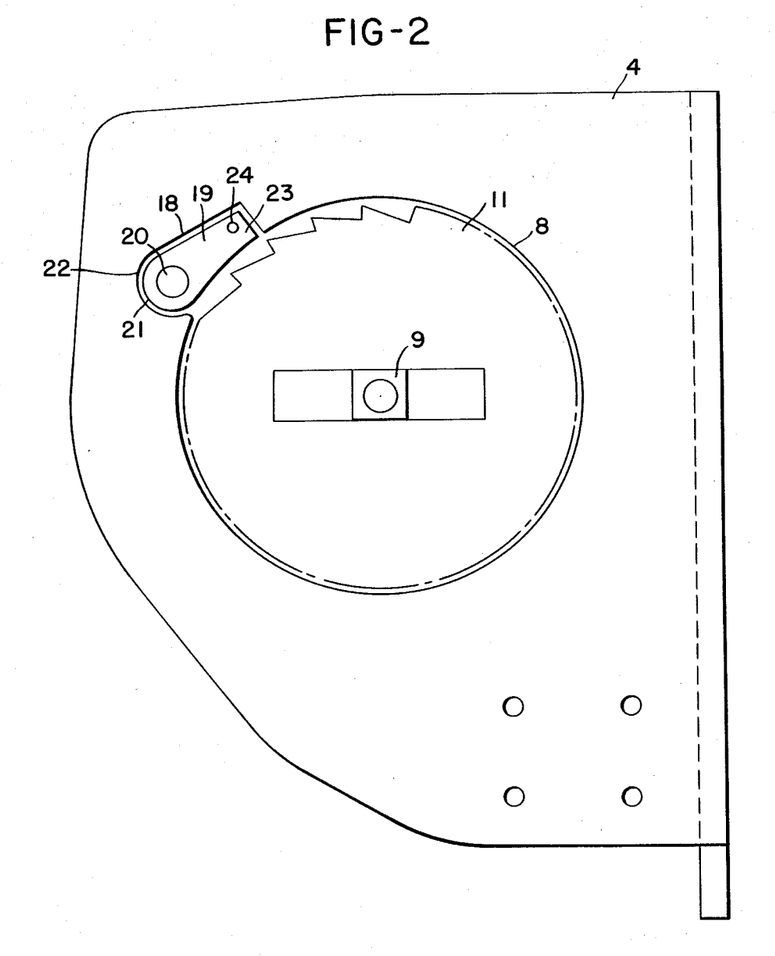
FIG. 2 is a plan view of one outer side of the housing of the belt reeling device.

Over a portion of its periphery, the first aperature 7 is provided with an internal toothing 17 which extends over an angular range of approximately 90 to 150 degrees, and is measured from the point at which the belt runs off tangentially, this point being located on the side of the U-crosspiece 2, approximately at the level of the shaft axis. The other, second aperture 8 has a smooth inside, or inside edge, which has a recess 18—likewise in an angular range between 90 to 150 degrees—in which a locking-latch 19 with a bearing hole 20 is mounted to pivot about an axis which is parallel to the axis of the belt shaft. The curved inner edge of the latch 19 is essentially flush with the curved inner edge of the second aperture 8. The outer edge of the latch 19 is designed with an arcuate shape in the region of the bearing hole 10, so that support surface 21 is formed with interacts with an associated support surface 22 of a portion of the inside of the recess 18 (FIG. 2).

That end of the latch 19 remote from the bearing hole 20 is designed as a ratchet 23 for engaging the toothed disc 11. A projection or pin 24, extending beyond the plane of the outer side of the U-leg 4 of the housing, serves as an actuating and guiding element, by means of which the pivoting movement of the latch 19 is controlled by a belt-sensitive locking device of conventional design, this device not being illustrated.

Figure 1A:
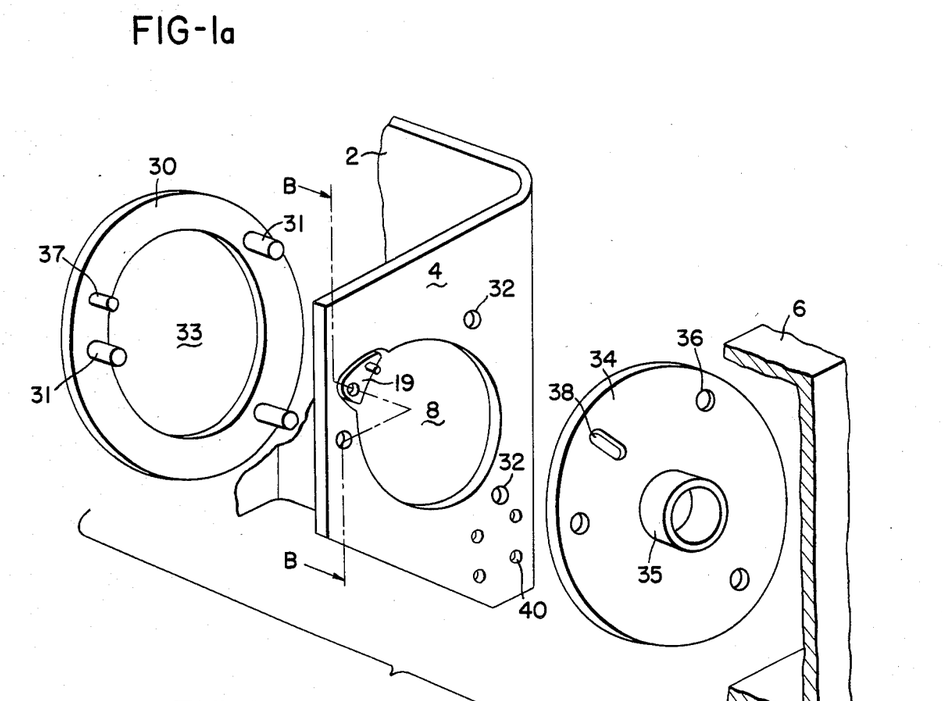
FIG. 1a is an exploded partial view of structural parts of a second bearing or journalling variation for the belt rewinding shaft (not shown), on one side of the housing.
Figure 1B:
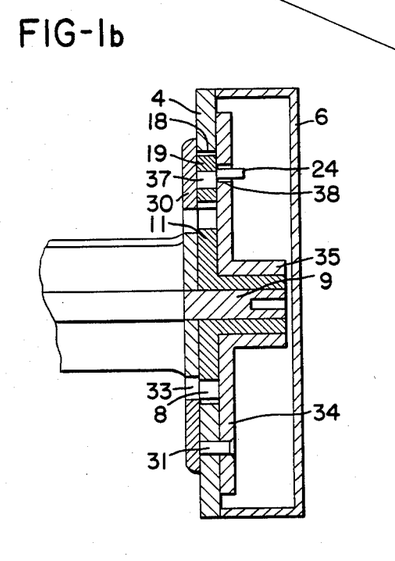
FIG. 1b is a diametral section along line B—B in FIG. 1a through the bearing system of the belt rewinding shaft of FIG. 1a having parts thereof assembled.

While the shaft bearing system according to FIG. 1 employs the journals 13, 14 and the openings 15 in the end faces of the shaft, the belt rewinding shaft 9 in the illustrated embodiment according to FIGS. 1a and 1b is mounted in a different manner. In this case, the mounting of the latch 19 is incorporated at the same time. For this purpose, an annular collar 30 is seated on the inner side of the U-leg 4 of the housing 1, this collar being attached to the inside of the U-leg 4 by means of three pins or rivets 31, and holes 32, appropriately located in the U-leg. In this arrangement, the aperture 8 and the circular interior space 33 of the annular collar 30 extend concentrically with each other. A bearing disc 34, with a central extension 35 in the form of a collar, is located on the outside of the U-leg 4 in order to receive one end of the shaft 9 in such a way as to allow the latter to rotate. The bearing disc 34 is pushed, by means of holes 36, onto the rivets 31, and the three components 30, 4 and 34 are rigidly connected to each other by means of the riveting operation.

The annular collar 30 has a diameter which is selected such that it overlaps the recess 18 on one side, whereby the possibility is created, in the case of this illustrated embodiment, to mount the latch 19 so that is con pivot. For this purpose, the collar 30 is provided with a pin 37, which extends into the recess 18. The bearing hole 20 of the latch 19 seats on the pin 37, as a result of which the latch 19 is pivotably mounted. At the same time, the edge regions 21 22 of the latch 19 and of the recess 18 are matched, in terms of shape, to each other in such a manner that the latch 19 can be supported, when in the pivoted-out position, in the recess 18, and thereby on the housing 1. By this means, the pin 37 and the collar 30 do not need to take up all the forces which are transmitted into the latch from the shaft 9 via the toothed disc 11.

In order to enable the pin-shaped actuating-element 24 for the latch 19 to move freely, the bearing disc 34 has a hole 38 in the form of a slot, through which the pin 24 projects to the outside. The length of the pin 24 is such that its free end, outside the disc 34, can be reliably detected or engaged by the device, not illustrated in FIGS. 1a and 1b, which senses the situation calling for locking, and triggers the locking mechanism.

Figure 3:
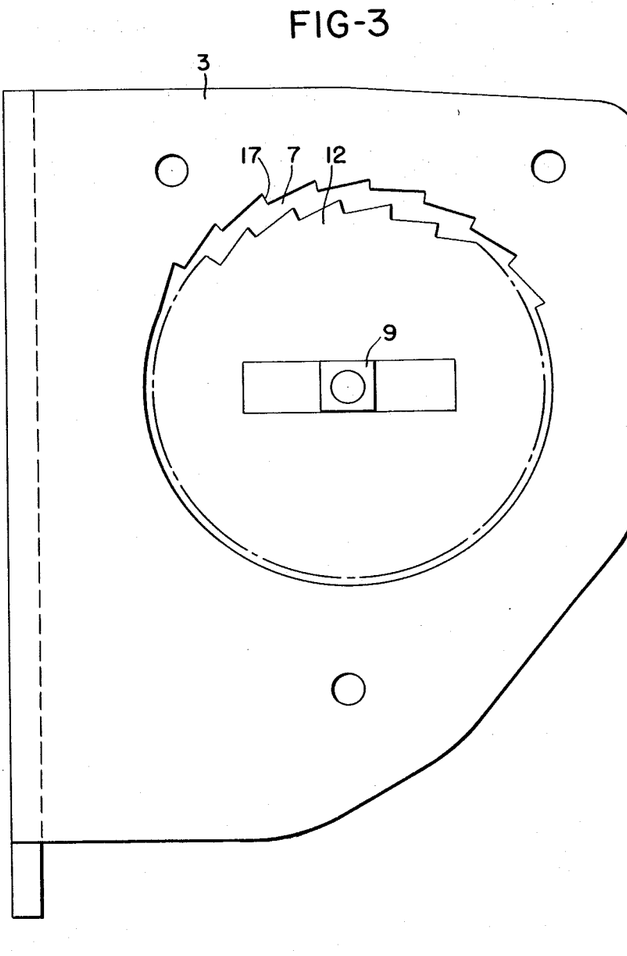
FIG. 3 is a plan view of the other outer side of the housing.

The belt reeling device according to the two illustrated and described embodiments functions, on locking, as follows: FIGS. 2 and 3 illustrate the starting positions of the shaft 9, the toothed discs 11, 12 and the latch 19. That is to say, these figures show the unloaded state. In this state, the shaft 9 is radially held, by means of its associated shaft bearing system, in such a manner that the toothed discs 11, 12 run coaxially in the associated apertures 7, 8. The latch 19 is pivoted back into its recess 18, and does not impede the rotation of the shaft.

If the safety belt is subjected to a situation characterized by normal loading, for example if the person who is strapped in moves the upper part of his or her body forward more quickly than usual, because the vehicle is braked in traffic, the belt-sensitive and/or vehicle-sensitive self-locking device reacts, and, by means of the pin 24, pivots the latch 19 with its latching-nose 23 towards the center of the aperture 8, so that engagement into the teeth of the toothed disc 11 takes place. The toothed disc 11 and the shaft 9 are thereby arrested, and the belt is locked against being pulled out further. The person who is strapped in can no longer move his or her body further forwards.

Radial deflection of the shaft 9 does not yet occur during this situation, which is characterized by normal loading. The toothed disc 12 inside the first aperture 7 is accordingly not yet in engagement with the internal toothing 17 and, furthermore, this engagement is delayed for an additional reason. The engagement conditions of the toothed disc 12 and the internal toothing 17, on the one hand, and of the toothed disc 11 and the latch 19, on the other hand, are in fact designed in such a way that, in the unloaded state, there is a small displacement between the two, by an angle α. This angle can be seen from FIG. 5, although this figure already shows that the toothed disc 12 has engaged with the toothing 17.

Figure 5:
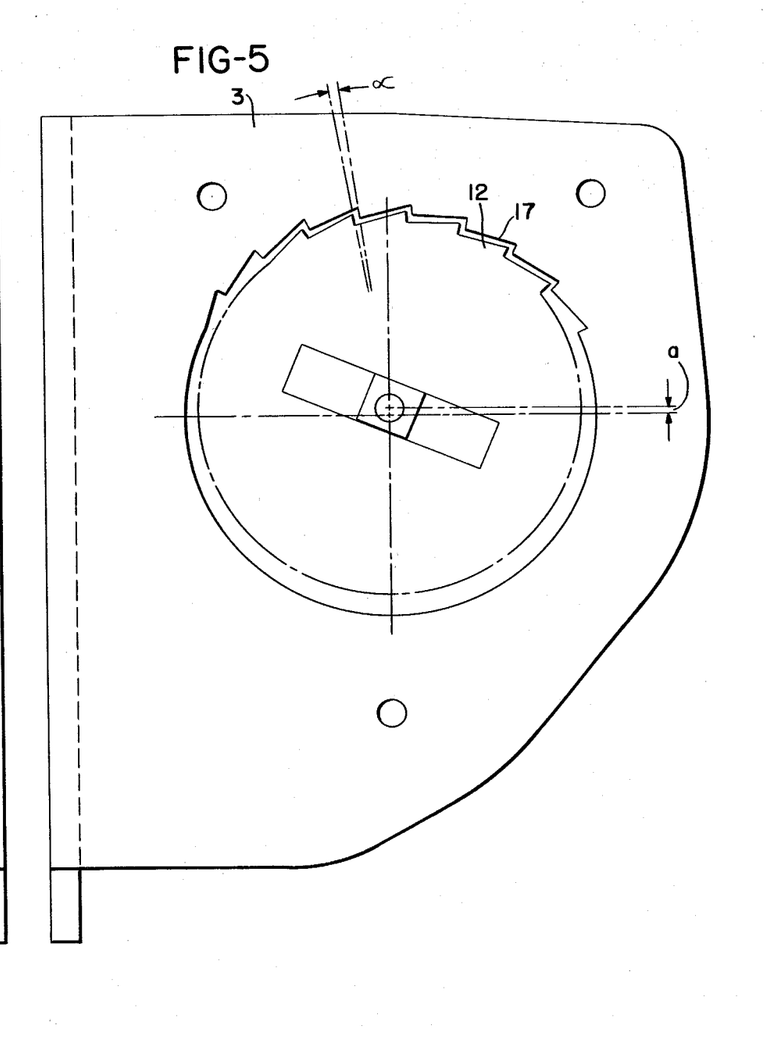
FIG. 5 shows the housing side of FIG. 3 in a different functional position.
Figure 6:
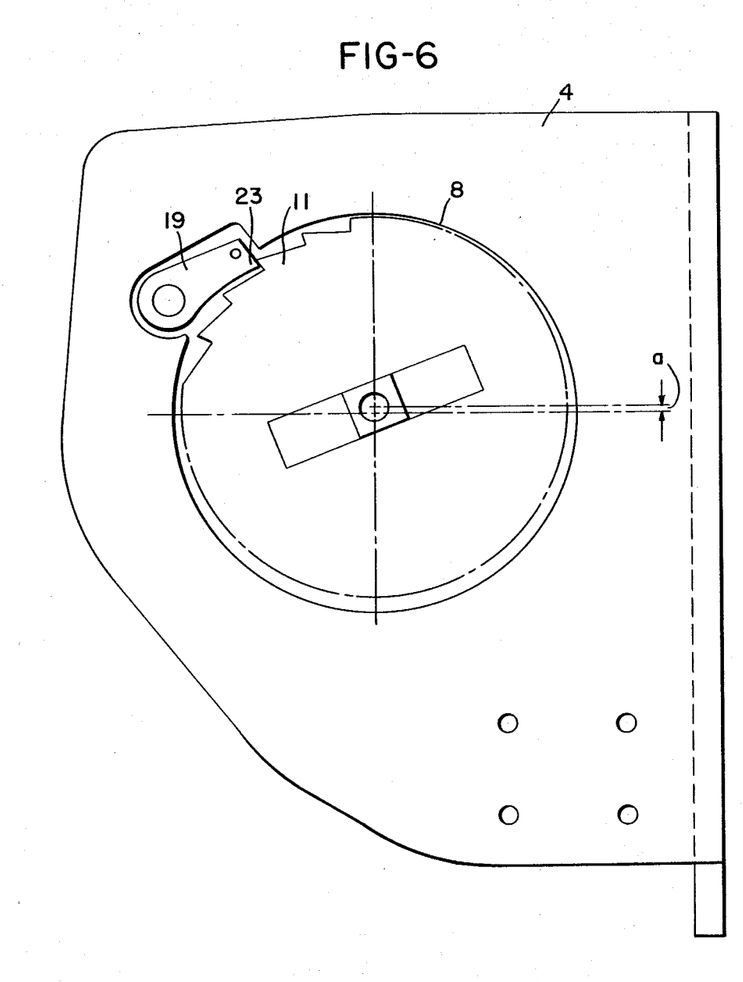
FIG. 6 shows the housing outer side of FIG. 2 in a further functional position.
Figure 7:
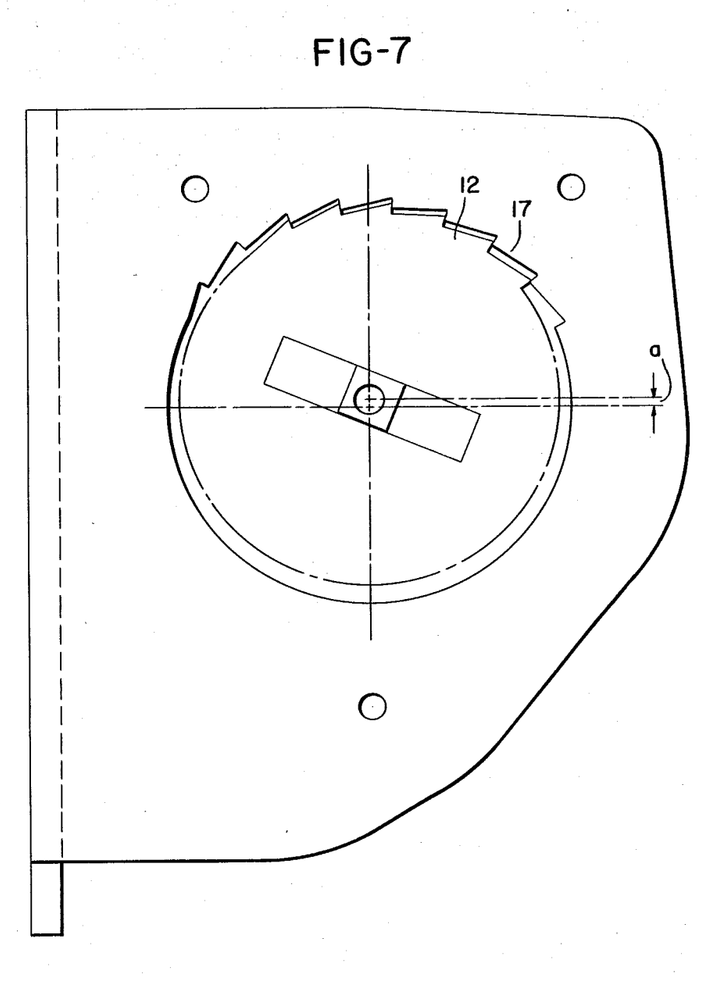
FIG. 7 shows the outer side of FIG. 3 in a further functional position which corresponds to the functional position of FIG. 6.

If, as the result of an accident or some other exceptional loading situation, very much higher belt forces occur, radial forces become effective on the belt rewinding shaft 9 following engagement of the latch 19 with the toothing of the toothed disc 11; these forces, on the one hand, radially displace the shaft by a distance "a" (FIGS. 5–8) and, on the other hand, bring both the toothed discs 11 and 12 into engagement with the associated toothings of the apertures 7 and 8, as can be seen from FIGS. 5 and 7. An additional locking action thereby results, which supports the acttion of the latch 19.

Various possibilities are available in the case of the design of the discs and apertures which respectively interact. The corresponding parts can, in principle, be without teeth, or they can be roughened, so that locking takes place exclusively by means of friction when the forces of the belt are sufficiently high. In this case, an additional effect can be achieved by means of an appropriate choice of materials. The parts will then "sieze", an effect which can indeed lead to the destruction of the belt reeling device, that is to say, the parts are no longer usable and must be exchanged.

In the practical realization of an embodiment of the belt reeling device, in which the apertures 7, 8 and the discs 11, 12 are without teeth, attention would indeed have to be paid to the requirement to provide a toothing on the disc 11 for the engagement of the latch 19. This toothing could, for example, be machined into the thicknesss of the material of the disc 11, parallel to its outer edge, which is without teeth. The special expense, associated therewith, appears to be justified in the case of special-design applications which do not call for mass production.

A further design possibility consists in providing the edge of the housing with toothing in the region of the first aperture 7, but not in the region of the second aperture 8, as a result of which the advantageous auxiliary or additional locking action already occurs, although only on one side. An appropriate design can be seen from FIGS. 6 and 7, this design having the advantage of comparatively low manufacturing cost.

Figure 8:
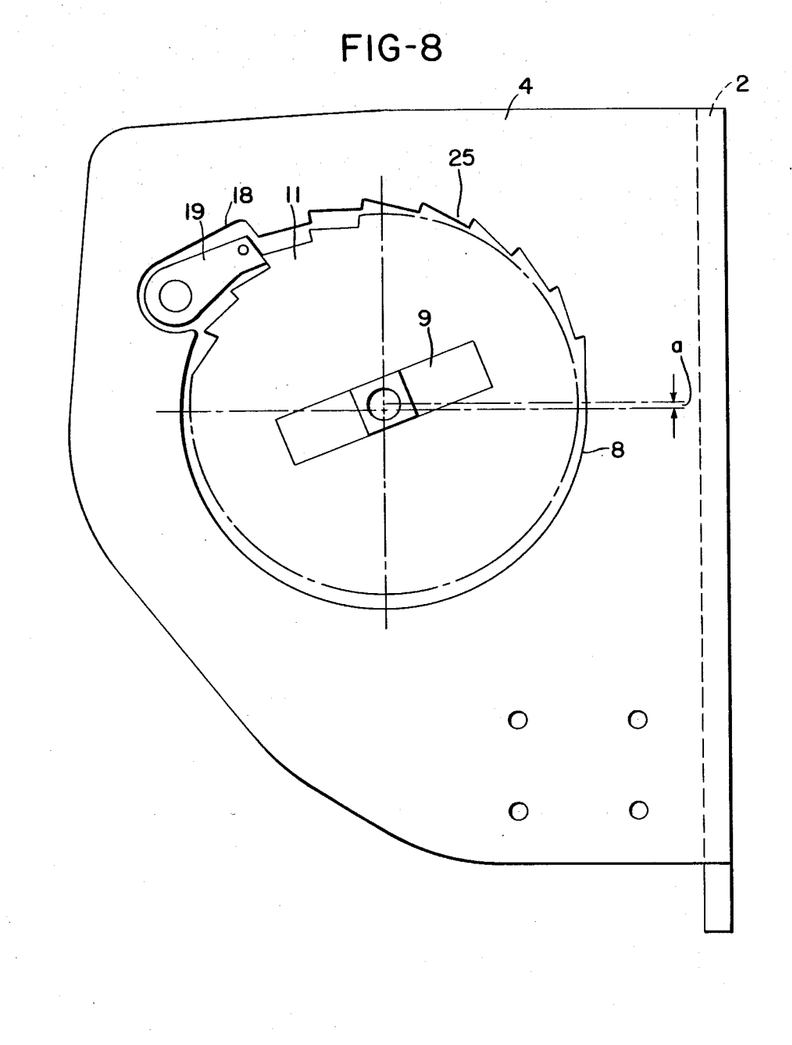
FIG. 8 shows the housing external side of FIG. 2 in a modified embodiment.
Figure 9:
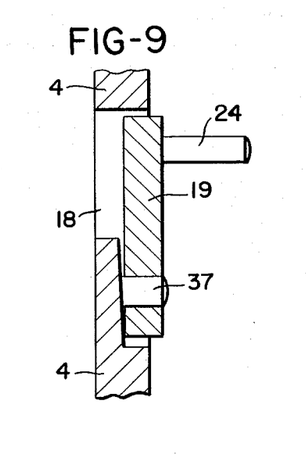
FIG. 9 is a fragmentary cross-sectional view to show one latch arrangement applicable for structure along line C—C in FIG. 1.
Figure 10:
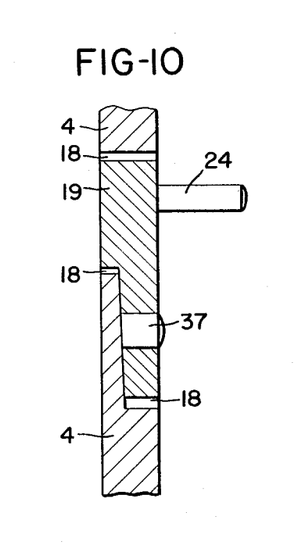
FIG. 10 is a fragmentary cross-section view to show another latch arrangement applicable for structure along line C—C in FIG. 1.
Figure 11:
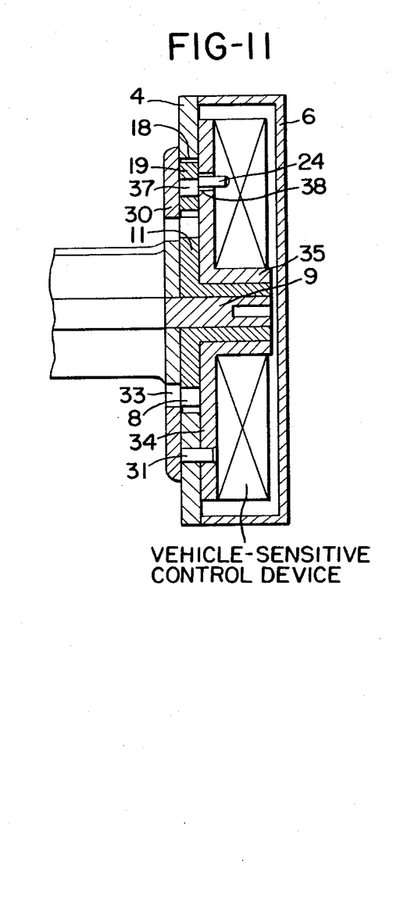
FIG. 11 is fragmentary cross-section view of a vehicle-sensitive control device.

The embodiment illustrated in FIG. 8 is particularly advantageous, according to which an internal toothing 25 is also provided on the side of the second aperture 8, and particularly in a sector region located in advance of the point of action of the latch 19, viewed in the direction of rotation of the shaft 9 and toothed disc 11. In FIG. 8, the direction of rotation of the shaft 9 and toothed disc 11 is counterclockwise. If excessive belf forces occur, this embodiment leads to the immediate relief of the load on the latch 19, whereby the protection of the person who is strapped in is also optimized in the event of a crash.

As the pull on the belt decreases and there is no excitation of the sensitive device, the components return once again into the function position illustrated in FIGS. 2 and 3. In this process, the resetting of the latch 19 can be brought about by means of short reverse movement of the toothed disc 11, or otherwise by means of a spring, which is not illustrated.

While the mounting of the latch 19 on the annular collar 30, which is attached to one of the two sides of the leg 4 of the housing, is particularly advantageous when the belt rewinding shaft is designed as a part of a pyrotechnical belt-tightener, the latch 19 can also be mounted in its recess 18 even without such an annular collar. For this purpose, at least a portion of the recess 18 is designed, in the axial direction of the shaft 9, to be narrower than the thickness of the wall of the leg 4 of the housing, and the pin 37, on which the bearing hole 20 of the latch 19 seats, is attached to this thinner wall-thickness of the leg of the housing, in the recess 18 (not illustrated). In this design, the thinner wall-thickness can incorporate either the entire recess 18, or only a portion thereof. The latch 19 then has a stepped shape, corresponding to the shape of the recess 189 in the direction of the axis of the belt rewinding shaft 9. The latch 19 does not need to be stepped if the entire recess 18 is machined, by milling alone, into the wall-thickness of the leg 4 of the housing.

Holes 40 are provided in the leg 4 of the housing, in the customary manner apparent in Canadian Pat. No 10 33 701-Pfabe issued June 27, 1978 and corresponding British Pat. No. 15 17 716 (Autoflug) published July 12, 1978, for the purpose of attaching a vehicle-sensitive control device, for example a ball sensor, for the self-locking of the belt reeling device. The sensor, attached at this position, acts, by means of an appropriate transmission member, on a locking disc 26, which can be seen in FIG. 1, located in the housing cover 6 between the toothed disc 11 and the journal or support 14. The control impulse from the locking disc 26 is then transmitted to the pin 24.

The present disclosure concerns automatic belt reeling or rolling-up devices for motor vehicles having safety belts installed therein. Consideration can be given as to how the latch 19 by means of the pin or projection 24 sensitive to the belt-band or vehicle can move from the rest position into the blocking or latching position. Naturally, something of this type is also possible with conventional means when the latch or pawl 19 does not rotate with the shaft 9, 10 but rather stands still.

A good example for a conventional construction for moving a fixed latch from the rest position into the blocking or latching position is disclosed by German Offenlegungsschrift No. 26 22 241-Rumpf which is baed upon a U.S. filing date of Apr. 2, 1976 for U.S. Ser. No. 673,350-Rumpf now U.S. Pat. No. 4,083,512-Rumpf issued Apr. 11, 1978 belonging to Firestone Tire and Rubber Co.

In the German Offenlegungsschrift No. 26 22 241 and corresponding U.S. Pat. No. 4,083,512 of Rumpf there should be considered the illustration of FIG. 5 therein. The belt drum 13 of FIG. 5 corresponds to the belt reeling or wind-up shaft 9, 13 with the invention and the blocking wheels or gears 20, 21 in FIG. 5 of Rumpf corresponding to the toothed discs 11 and 12 of the invention. A latch 25 of Rumpf engages in the blocking wheels or gears 20, 21 when the latching or blocking is to occur; this means that this latch 25 corresponds to the latch or blocking pawl 19 according to the present invention. The pawl or latch 44 in FIG. 5 of Rumpf *does not* correspond to the latch 19 of the present invention.

The latch 25 of Rumpf moves back and forth like the latch 19 according to the present invention. The latch 25 is moved into the two positions thereof by an actuating lever 26. This actuating lever 26 has a catch or follower nose 70 and this nose corresponds to the pin 24 according to the present invention. Also, with the Rumpf disclosure, there is noted accordingly that the latch 25, lever 26 and nose 70 do not rotate with the belt drum. The latch 25 nevertheless is brought selectively into the blocking or latching position either sensitive to the belt or vehicle.

The element which brings about both the belt-sensitive and also the vehicle-sensitive blocking of the drum 13 of Rumpf is the fly wheel 36, 37 which conventionally is referred to and called an inertia disc. This fly wheel or inertia disc corresponds to the locking disc 26 mentioned previously in the specification for the present invention. The fly wheel or inertia disc has *two* functions, namely during rapid belt withdrawal, removal or extension to remain inactive, neutral or lagging behind the rotation of the drum 13 (Rumpf) and thereby to rotate the inner-toothed blocking wheel or gear 50 slightly or a little bit via the pawl or latch 44, whereby the nose 70 of the lever 26 and with that the latch 25 are moved. Accordingly, no linear movement of the parts including the nose 70 and lever 26 occurs as a result of a rotational movement of the wheel or gears 36, 37 and exactly the same provision is made with the features of the present invention.

Figure 4:
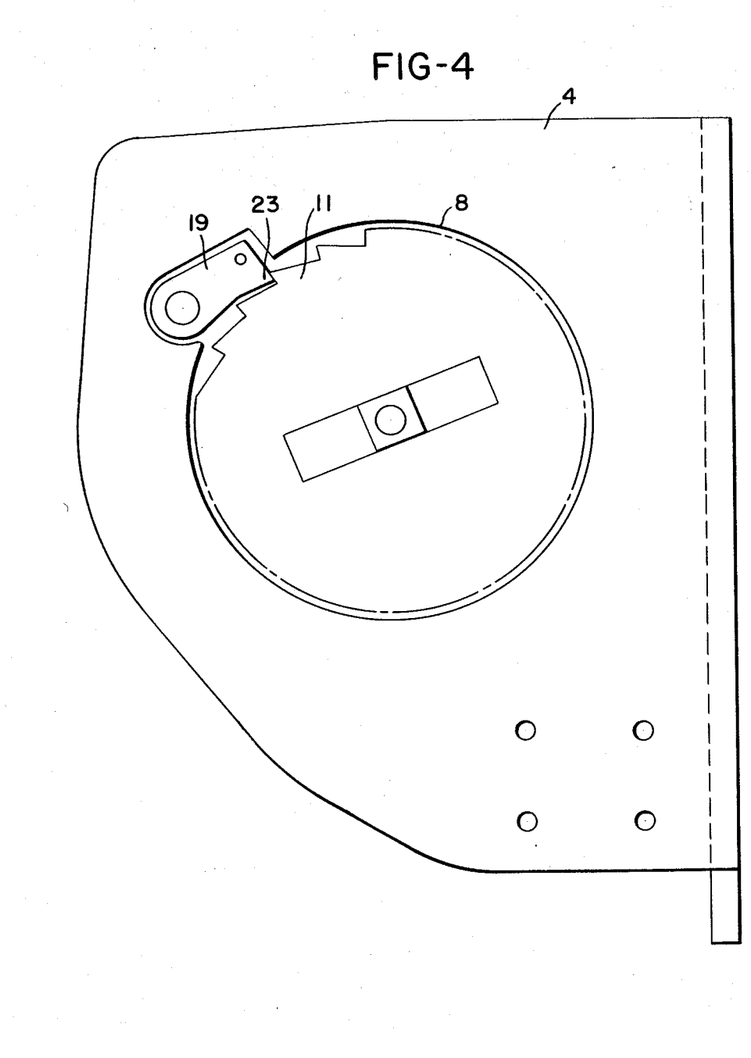
FIG. 4 shows the housing outer side of FIG. 2 in a different functional position.

Also the vehicle sensitive blocking is carried out via the fly wheel 36, 37 (inertia disc) and moreover via a pendulum sensor 60 according to FIG. 4 of Rumpf. This sensor has a lever 34 which meshes or engages in the teeth 36 of the fly wheel or inertia disc and secures or holds the same back to detain or restrain, set or lock this fly wheel or inertia disc. Consequently, the pawl or latch 44 is immediately caused to travel out or deflect, which turns or rotates the toothed wheel or gear 50 slightly or a little bit whereby the nose 70 is pivoted or swung so that the latch 25 blocks the drum 13. The teeth of the disc 26 with the present invention also serve for contact with a lever of non-illustrated (inertia) ball-sensor or pendulum sensor.

Important with the evaluation and consideration of the procedure, operation or action in automatic belt blocking is that at the moment of the sensing either by rapid belt withdrawal or extension or by a sudden vehicle movement there is no rotation necessary for triggering or releasing the blocking but rather only a comparatively very short path is sufficient which is brought about by the slight or nominal lagging behind or short stopping or holding of the pertaining fly wheel or inertia disc (36, 37 with Rumpf; 26 with the present invention) and such very short path is sufficient to bring a latch or pawl or other arresting member into the blocking position. This means that at the moment of sensing absolutely no rotation occurs but rather only a shifting of parts occurs by approximately 5°-10° sectoral upon the belt reeling or wind-up shaft.

The vehicle-sensitive control device mentioned in the present disclosure is illustrated only as a box in a manner similar to the box 10 according to U.S. Pat. No. 4,350,313-Adomeit dated Apr. 20, 1978.

U.S. Pat. No. 3,851,837-Griffin dated Dec. 3, 1974 specifically shows a radially shiftable belt reeling or wind-up shaft 30 in lateral slots 18 as well as a latch member 42 for engagement in the teeth 28 of tooth discs 26 on both sides whereby however, the latch 42 does not perform the dual function described for the present invention, which particularly is to be considered as a speciality of the present invention. A difference as to the features also exists therein that the tooth discs of Griffin U.S. Pat. No. 3,851,837 are not arranged in openings of the housing shank and rotate as is the case with the disclosure of the present invention.

U.S. Pat. No. 3,876,164-Dully dated Apr. 8,1975 shows a belt retractor which has basically the same principle as the belt retractor of Griffin U.S. Pat. No. 3,851,837 and, for this reason, the statements made in the foregoing paragraph as to Griffin are applicable also for Dully.

U.S. Pat. No. 4,223,853-Ernst dated Sept. 23, 1980 which is assigned to the assignee of the present invention is concerned with improvements in the field of noise development and wear, and which does not solve any problems as to the blocking of the belt wind-up or reeling shaft.

The British Pat. No. 2,057,853-Adomeit relates back to the German Patent of addition No. 2,936,053 as to the further reference of German Offenlegungsschrift No. 26 46 238-Adomeit dated Apr. 20, 1978 which is the basic priority disclosure for U.S. Pat. No 4,350,313-Adomeit issued Sept. 21, 1982 on a Belt Wind-up Roller for Vehicle Safety Belts with Blocking Device, so that these two Adomeit references relate to and concern belt retractors of the same functional principle but which is different from the teaching of features of the present invention.

The present invention is, of course, in no way restricted to the specific disclosure of the specification and drawings, but also encompasses any modifications within the scope of the appended claims.

Wat we claim is:

1. A self-locking belt reeling device, comprising:
   a housing having a first and a second aperture, said second aperture being provided with a recess;
   a belt rewinding shaft having two ends and being mounted in said housing in such a way as to prevent axial movement yet allow radial movement under the action of locking forces, said ends of said shaft extending through said apertures of said housing;
   a disc respectively provided near each end of said shaft, said discs being respectively located in the plane of the associated aperture, with at least that disc associated with said second aperture being a toothed disc, at least one of said apertures being provided with a fixed inner toothing for engagement by the associated disc when locking forces occur;
   a latch pivotably mounted in said recess of said second aperture in such a way as to be pivotable into said second aperture and into the toothing of said toothed disc associated therewith;
   an actuating element arranged on said latch; and
   a device, for actuating self-locking, associated with said housing and controlling said actuating element, said device sensing forces requiring locking of said belt rewinding shaft.

2. A belt reeling device according to claim 1, in which said second aperture is tooth-free.

3. A belt reeling device according to claim 1, in which a portion of the periphery of said second aperture is provided with an inner toothing which serves as an auxiliary locking mechanism.

4. A belt reeling device according to claim 1, in which said latch is pivotable about an axis which is parallel to the axis of said belt rewinding shaft.

5. A belt reeling device according to claim 4, in which said actuating element is a pin which is parallel to said pivot axis of said latch.

6. A belt reeling device according to claim 5, in which said pin is directed to the outside of said housing.

7. A belt reeling device according to claim 4, in which said recess is provided with a support surface, and in which said latch is provided with a support surface which is associated with said support surface of said recess.

8. A belt reeling device according to claim 4, in which at least a portion of the periphery of said first aperture is provided with an inner toothing, and in which said recess with said latch, as well as said inner toothing of said first aperture, are located in an angular range of 90° to 150° calculated from the tangential belt run-off point in the direction of rotation of said shaft during withdrawal of a belt.

9. A belt reeling device according to claim 8, in which, in the unloaded state, the engagement between said inner toothing of said first aperture and the associated disc is displaced by a lag angle relative to the engagment between said latch when it is pivoted-out and the associated toothed disc.

10. A belt reeling device according to claim 9, in which said angular displacement is at most 5°.

11. A belt reeling device according to claim 4, which includes a retaining member which is fastened to the inner side of an associated housing part in the region of said recess, said retaining member being provided with a pin, and said latch being provided with a bore by means of which said latch is pivotably mounted on said pin of said retaining member.

12. A belt reeling device according to claim 11, in which said retaining member is an annular collar having a central aperture which is coaxial to said second aperture, said belt rewinding shaft passing through said central aperture.

13. A belt reeling device according to claim 11, which includes a bearing disc fastened to the outer side of said associated housing part and simultaneously serving to hold said retaining member, that end of said belt rewinding shaft which passes through said second aperture being mounted on said bearing disc.

14. A belt reeling device according to claim 13, in which the center of said bearing disc, on that side thereof remote from said retaining member and said associated housing part, is provided with a sleeve-like extension for mounting said belt rewinding shaft.

15. A belt reeling device according to claim 13, in which said bearing disc, in the zone of movement of said actuating element of said latch, is provided with a corresponding hole for said actuating element, said actuating element having such a length that it i effectively controllable from that side of said bearing disc remote from said associated housing part.

16. A belt reeling device according to claim 15, in which said bearing disc and said retaining member are connected to each other and to said associated housing part by a plurality of common fastening elements which extend through said associated housing part.

17. A belt reeling device according to claim 1, which includes lateral housing covers, said belt rewinding shaft being mounted on said housing covers outside said housing.

18. A belt reeling device according to claim 17, in which at least a portion of said recess for said latch is thinner in the axial direction of said belt rewinding shaft than the thickness of the associated housing part, and which includes a bearing pin fastened on said thinner wall thickness of said associated housing part, said latch being provided with a hole by means of which said latch is pivotably mounted on said bearing pin.

19. A belt reeling device according to claim 18, in which said latch has a stepped configuarion in the axial direction of said belt rewinding shaft in conformity with the configuration of said recess.

20. A belt reeling device according to claim 1, in which said device for actuating self-locking is a vehicle-sensitive control device which acts on said actuating element and is arranged on said housing.

* * * * *